Nov. 17, 1959     T. E. QUICK     2,913,055

PROPULSION DEVICE

Filed Sept. 1, 1950

INVENTOR.
THOMAS E. QUICK
BY
Charles R. Werner
ATTORNEY

2,913,055
PROPULSION DEVICE

Thomas E. Quick, Wichita, Kans.

Application September 1, 1950, Serial No. 182,653

17 Claims. (Cl. 170—135)

This invention relates in general to propulsion units for aircraft and in particular to a simple, efficient, compact, and economical means of propulsion resulting from unbalanced forces caused by creating a low pressure area at the forward end of the power plant nacelle, a powerful and concentrated forward thrust being obtained by the differential in atmospheric pressure between the immediate areas surrounding the forward and rear portions of the power plant nacelle.

In my device the low pressure area is produced by the rapid rotation of a longitudinally-finned cone or impeller at the forward end of the power plant nacelle, the centrifugal force imparted by the impeller tending to force the air away therefrom with a resultant decrease in air pressure in the area immediately surrounding the cone.

Although any one of numerous means for actuating the impeller may be employed, I contemplate the use of a turbo-jet propulsion means primarily because my invention will improve the efficiency of a turbo-jet engine.

My analysis of the efficiency output of turbo-jet engines, insofar as kinetic energy is concerned, has led to the following hypothesis:

The maximum potential equivalent in horsepower obtainable by the conversion of the thermal value of one pound of fuel (20,000 B.t.u.) would be approximately eight horsepower for one hour (one horsepower being equal to 550 foot pounds per second or the equivalent of one pound of thrust at a velocity of 550 feet per second). The thrust equivalent obtainable by conversion of one pound of fuel is approximately eight pounds with a velocity of 550 feet per second.

Present turbo-jet aircraft engines consume approximately one pound of fuel for each pound of thrust per hour or an overall thrust efficiency of approximately 12½% at 550 feet per second when compared with potential thrust efficiency. Present turbo-jet power plants are only 50% efficient in their production of kinetic energy, that is, only about one-half of the heat value of the fuel is converted into kinetic energy, the remainder being wasted as heat.

If this 50% potential efficiency could be fully utilized, then at 550 feet per second, four pounds of thrust for each pound of fuel per hour could be obtained. However, with an actual thrust of one pound per pound of fuel per hour, there is being wasted 75% of the actual kinetic energy generated by the turbo-jet. The efficiency loss is approximately 50% due to thermal effects and 75% of the remaining 50% is lost by inefficient application of kinetic energy generated resulting in an overall efficiency of only 12½% of the maximum potential.

My invention contemplates a much greater return in efficiency for expenditure of kinetic energy by utilizing a portion thereof for imparting rotational motion to a centrifugal impeller which, in turn will use a much greater mass of air for reaction purposes and thereby provide a greater reactive thrust for a given amount of expended kinetic energy.

At a turbo-jet discharge velocity of 2200 feet per second, only one-quarter of a pound of thrust for each kinetic energy horsepower expended can be expected, whereas with my invention, using a lower slipstream velocity and a greater air mass, a much greater reaction or thrust force can be obtained from a given kinetic energy horsepower expenditure. In other words, at the lower velocity of 550 feet per second my propulsion unit will provide a theoretically potential reactive force or thrust approaching about one pound per horsepower of kinetic energy expended, whereas the present turbo-jet at four times the velocity, or about 2200 feet per second, provides a reactive force or thrust of only one-quarter pound per horsepower of kinetic energy expended.

The mass of air used will be proportional to the size and r.p.m., of the impeller, the air speed, the horsepower expended, and the size and extent of the low pressure area into which the air mass moves and is discharged from; all the factors being coordinated according to the thrust required and the power and speed of the aircraft. In general the air mass used in my propulsion unit will normally be from four to eight times greater than that normally used by the conventional turbo-jet engine and the resultant thrust and propulsive efficiency will be much greater.

The objects of the invention are, first; to provide an aircraft propulsion unit employing a high speed centrifugal impeller which will create a low pressure area in front of the propulsion unit, forward movement of which will result from the tendency of atmospheric pressure to balance the unbalanced pressures and move the propulsion unit into the low pressure area.

Second; to provide an aircraft propulsion unit employing a high speed, finned, centrifugal impeller, the fins being so shaped and arranged as to create a substantially cylindrically shaped low pressure area about the forward portion of the propulsion unit, and to impart a high pitched spiral motion to the air, forward thrust to the unit being imparted by the atmospheric pressure at the rear of the unit.

Third; to provide an aircraft propulsion unit employing a high speed centrifugal impeller having a plurality of longitudinal fins so shaped and arranged as to move the air away from the face of the impeller to create a low pressure area adjacent said impeller and imparting a high-pitched spiral motion to the air which has moved through the low pressure area from the area forward of the impeller. This reduces the impact area and resistance to forward thrust imparted to the propulsion unit by air at atmospheric pressure urging the propulsion unit forward into the low pressure area.

Fourth; to provide an aircraft propulsion unit comprising a combination of a turbo-jet engine, a high speed centrifugal impeller positioned forward of and driven by the turbo-jet engine, said impeller creating a low pressure area adjacent said impeller and forward of the turbo-jet engine whereby engine thrust and the atmospheric pressure will impart forward movement of the propulsion unit toward the low pressure area.

Fifth; to provide an aircraft propulsion unit comprising a combination of a turbo-jet engine, a high speed centrifugal impeller positioned forward of and driven by the turbo-jet engine, air passages through the impeller for directing a large mass of air to the turbo-jet engine to increase the efficiency thereof, said impeller creating a low pressure area thereabout, atmospheric pressure and turbo-jet engine thrust moving the propulsion unit forward into the constantly created low pressure area.

Sixth; to provide an aircraft propulsion unit comprising a streamline body, the forward portion of said body forming a high speed centrifugal impeller, actuating means for the impeller carried in the streamline body, the impeller creating a low pressure area about the forward end of the streamline body, atmospheric prsesure constantly urging the streamline body forward into the constantly created low pressure area.

Seventh; to provide an aircraft propulsion unit comprising a streamline body, a high speed centrifugal impeller at the forward end of said body, longitudinal fins on said impeller adapted to create a low pressure area about the forward end of the streamline body and to impart a high pitched spiral motion to the air under atmospheric pressure moving rearwardly into the low pressure area, said spiral motion tending to increase the extent of the low pressure area by its centrifugal motion, stationary fins on the streamline body so shaped and arranged as to tend to convert the spiral motion of the air into a linear motion along the longitudinal axis of the streamline body for additional increase in thrust.

Although this specification confines its language to a propulsion device for aircraft it is to be understood that it can be employed for missiles, guided or otherwise, and generally for any propelled device in which propulsion is obtained by other than frictional contact with an inert surface or medium.

Other objects and advantages as well as the construction and operation of my invention will be apparent by reference to the following description in connection with the accompanying drawing, in which:

Fig. 2 is a fragmentary longitudinal view of the form of my invention shown in Fig. 1, parts being shown in section, with a slight modification in the rear end of each rotating fin.

Figure 1:
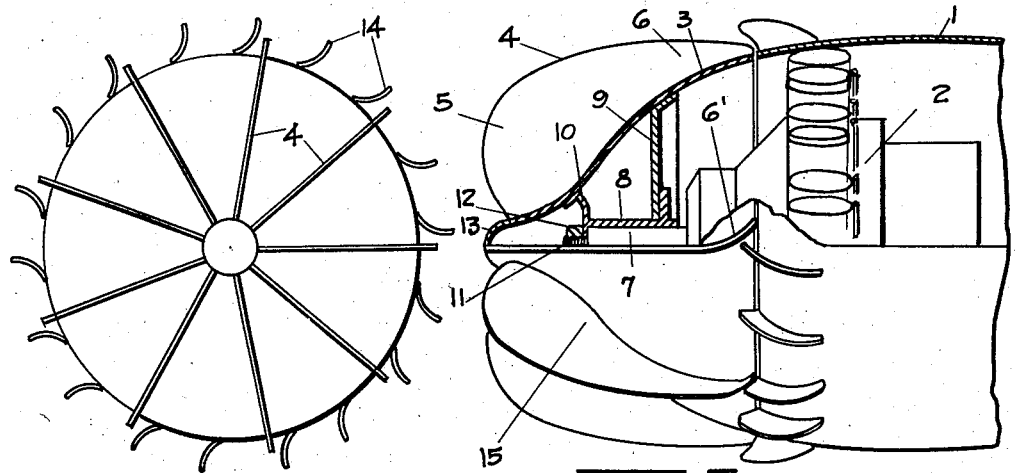
Fig. 1 is a front elevational view of one form of my invention in which the power unit may be of the conventional internal combustion or similar type engine which does not depend on a large amount of air for efficiency in operation.

The propulsion unit comprises the streamline nacelle 1 enclosing the power plant 2 which may be of the conventional internal combustion type or the like.

Comprising the entire forward end of the nacelle and driven by the power plant 2 is a substantially conoidally shaped impeller 3 having a plurality of radially disposed, relatively thin, longitudinal planar fins or blades 4, the forward portions 5 of which may be wider in facial area than the rear portions 6. In the form shown in Fig. 2 the rear portions 6' are curved slightly as shown for the purpose hereinafter specified. The outside overall diameter of the fins is preferably approximately the same as the largest outside diameter of the nacelle.

One suitable mounting of the impeller to the power plant or engine may be as shown in Fig. 2. The shaft 7 of the engine 2 is carried in hub 8, supported by transverse walls 9 and 10, the reduced, threaded end 11 of shaft 7 passing through the wall 10, a nut 12 securing the shaft against endwise movement in the hub. A suitable spinner 13 provides access to the nut and completes the streamlining of the impeller.

In one form of my invention is shown mounted on the nacelle 1, adjacent the impeller 3, a plurality of outstanding curved fins 14. The curve of the fins 14 is opposite to the curve of the ends 6' of the fins 4. I have shown the fins 14 in the proportion of about 2 to 1 in relation to the number of longitudinal fins 4. However, I do not wish to be limited to this quantity, as more or less fins may be used without changing their function, the proper number depending on operating characteristics. Also, fins 14 may be used with straight fins 4 as shown in Fig. 1 without the curved ends 6' as shown in Fig. 2, or fins 14 may also be rectilinear.

The function of the fins 14 is to convert the high pitched spiral motion imparted to the inrushing air by the impeller 3 to a linear motion along the longitudinal axis of the nacelle.

In the operation of the form of my propulsion unit shown in Figs. 1 and 2, the impeller is rotated at a high rate of speed, the centrifugal force imparted to the air mass adjacent the impeller moving it away from the impeller and creating a low pressure area as shown at 15. The entire nacelle except the impeller is being subjected to the uniform pressure of the atmosphere and it is a well known phenomenon that unequal pressures tend to equalize themselves. Consequently, atmospheric pressure on the rear portion of the nacelle will urge it forward toward the low pressure area, imparting a forward thrust to the nacelle.

The air forward of the impeller 3 will tend to move toward the low pressure area 15 but the rotation of the blades or fins 4 of the impeller and their peculiar configuration will impart a centrifugal action to this air under atmospheric pressure and will cause it to move in an outwardly high pitched spiral direction, this action enhancing the creation and maintenance of the low pressure area and also reducing the forward impact area toward which the rapidly moving nacelle is continually being forced. This will increase the efficiency of the forward thrust being constantly created by the equalizing tendencies of the unbalanced pressures. The spiral motion of the air stream from the impeller is converted to a substantially linear motion by the fins 14.

Figure 3:
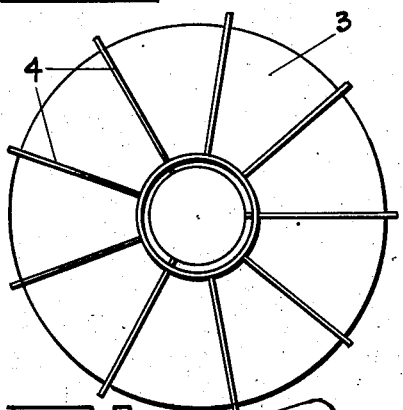
Fig. 3 is a front elevational view of a modified form of propulsion unit in which a turbo-jet engine is used.
Figure 4:
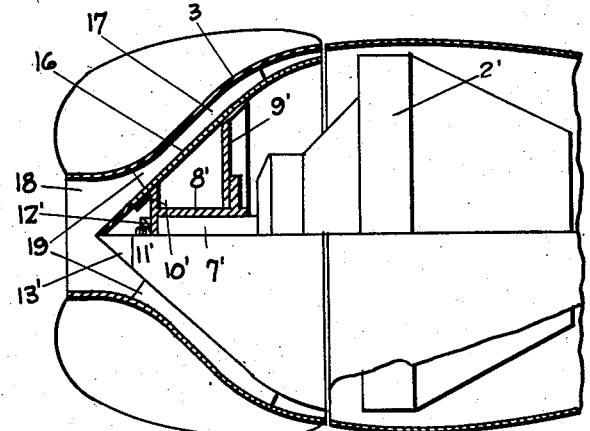
Fig. 4 is a fragmentary, longitudinal sectional view of the modified form, parts being shown in elevation.

In the form of my device shown in Figs. 3 and 4, the structure is modified somewhat by providing an inner cone spaced from the impeller 3 to provide an air passage 17. The front of the impeller has an opening 18 to permit intake of air to the passage 17. Webs 19, between the cone 16 and the impeller 3, support these two members in spaced relation. The remaining structure is similar to that shown in Figs. 1 and 2, with shaft 7' supported in hub 8', transverse walls 9' and 10' being carried by inner cone 16. The reduced threaded portion 11' of the shaft 7' passes through wall 10' and receives the nut 12'. The spinner 13' covers the nut and is contained entirely within the impeller. The radius of the opening 18 is greater than that of the spinner 13' to permit removal of said spinner.

Passage 17 opens into the interior of the nacelle where the power plant 2' is located. Where turbo-jet engines are employed, air must be supplied and passage 17 permits air flow to the turbo-jet engine.

Figure 5:
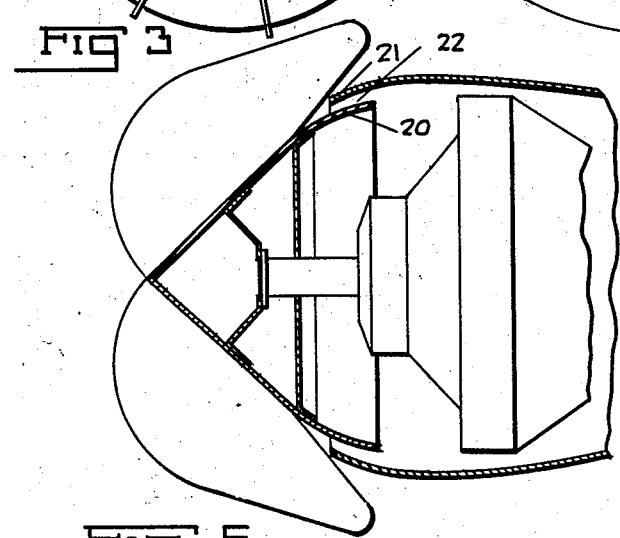
Fig. 5 is a fragmentary, longitudinal sectional view through a further modified form of my invention.

In the modification shown in Fig. 5, the rear portion 20 of the impeller is spaced from the forward portion 21 of the nacelle to provide an air passage 22 into the interior of the nacelle, nacelle portion 21 overlapping impeller portion 20.

Figure 6:
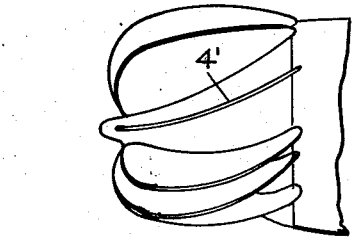
Fig. 6 shows a side elevational fragmentary view of another modified form of my invention.

In the form shown in Fig. 6, some degree of pitch may be given to the blades 4'.

With my propulsion device used with turbo-jet engines several things are accomplished which tend to create an extremely efficient propulsion system.

First; the differential pressure system provides forward thrust.

Second; the impact area and resistance are reduced.

Third; a larger air mass is moved at a lower velocity resulting in greater thrust and propulsion efficiency.

Fourth; the increased efficiency of the turbo-jet and its resultant thrust is further enhanced by the thrust of the differential pressure system.

My invention fills the gap between relatively low speed screw propellers powered by internal combustion engines and the high speed turbo-jet and similarly powered devices.

Obviously, changes in form, proportion and details of construction may be made in my invention without departing from the spirit thereof, and I reserve all rights to such changes as come within the scope of these specifications and the claims which follow.

What I claim as new and desire to secure by Letters Patent is:

1. A propulsion device employing a body having a continuous streamline curved surface, the forward end of the body comprising a driven impeller, said impeller having a relatively small frontal air intake area and a peripheral air discharge area the full length of the impeller relatively large in relation to the frontal air intake area.

2. In a propulsion device, a streamline body having a smooth continuous aerodynamic curved surface, a rotatable conoidally shaped finned impeller forming the forward portion of the streamlined body, the rear annular edge of the impeller being in approximate alignment with the forward annular edge of the streamline body, a central opening at the forward end of the impeller, an inner conoidal shell member substantially the full length of the impeller and having its apex centered in respect to the central opening and its sides in substantially parallel spaced relation to the impeller, said impeller and inner shell forming an annular air passage opening into the body of the propulsion device.

3. In a propulsion device, a body, a conoidally shaped impeller at the forward end of the body, external planar horizontally elongated fins on the impeller disposed along the longitudinal axis thereof and adapted to discharge air radially along the full length of the impeller, the air intake area at the front of the impeller being less than the air discharge area about the full length periphery of the impeller.

4. A propulsion device as described in claim 1 wherein said body has a plurality of fins projecting from the continuous streamline curved surface of said body at the rear of the peripheral air discharge area of the impeller for directing rearwardly moving air in a substantially rectilinear direction of said body.

5. A propulsion device as described in claim 3 wherein ends of the said elongated fins at the larger end of the conoidally shaped impeller are curved away from the direction of rotation of the impeller.

6. A propulsion device as described in claim 3 wherein ends of the fins at the larger end of the conoidally shaped impeller are curved away from the direction of rotation of the impeller, and a plurality of fins on the body directing rearwardly moving air in a substantially rectilinear direction, the fins on the body being curved in a direction opposite to the curve of the fins on the impeller.

7. A propulsion device as described in claim 3 including an actuator in the body having driving connection with the impeller, the diameter of the body adjacent the impeller being slightly larger than the diameter of the conoidal portion of the impeller at that point to provide an air passageway therebetween for discharge of air into said body to the actuator.

8. A propulsion device as described in claim 3 wherein the conoidally shaped impeller comprises a conoidally shaped shell carrying the elongated fins, the propulsion device including an actuator within the body having connection with the conoidally shaped shell to rotate the impeller, the diameter of the body adjacent the impeller being slightly larger than the diameter of the said conoidal shell at that point and the conoidal shell extending partially into the body to provide an air inlet passageway therebetween for directing air into said body to the actuator.

9. A propulsion device as described in claim 3 wherein the impeller has a conoidally shaped portion carrying the elongated fins, and an actuator in the body having connection with the impeller to rotate the impeller, the diameter of the body adjacent the impeller being slightly larger than the diameter of the said conoidal portion of the impeller at that point and the conoidal portion of the impeller extending partially into the body to provide an air inlet passageway therebetween for directing air into the body to the actuator and the ends of the fins at that end of the impeller extending rearwardly past the forward edge of the body and externally thereof.

10. In a propulsion device as described in claim 3, wherein said ends of the fins at the front of the impeller are of substantially greater depth than the depth at the rear end of the impeller and provide longitudinal passageways therebetween for flow of air from the air intake area at the front of the impeller through said passageways in contact with said aerodynamic surface incidental to forward movement of said body, and means for rotating the impeller.

11. In a propulsion device, an elongated body having a continuous streamlined surface adapted to be moved through the air and having a circumferentially aerodynamic faired exterior, the forward end of said body comprising an impeller having a hub of substantially conoidal shape and fairing with the circumferential surface of said aerodynamic body to provide a substantially continuous air foil surface, a plurality of external planar horizontally elongated fins disposed upon said hub along the longitudinal axis thereof and spaced apart circumferentially of and projecting radially from said airfoil surface of the hub in longitudinal planes passing through the axis of said hub and adapted to discharge air radially along the full length of the impeller, the air intake area at the front of the impeller being less than the air discharge area about the full length periphery of the impeller, said forward ends of the fins being of substantialy greater depth than the depth of their rear ends and providing longitudinal passageways therebetween for flow of air from the air intake area at the front of the impeller through said passageways in contact with said aerodynamic surface incidental to forward movement of said body, and means for rotating the impeller.

12. A combination as described in claim 11, wherein the overall diameter of the blades is approximately the largest outside diameter of the elongated streamlined body.

13. A combination as described in claim 11, wherein the length of the blades is greater than the depth of the forward ends of said blades.

14. In combination with an elongated streamlined hollow body adapted to be moved through a fluid and having a circumferential aerodynamic faired exterior extending rearwardly from a transverse plane at the forward end of said body, a power unit within said body, means actuated by the power unit for imparting velocity to the fluid to effect flow rearwardly along said body and in contact with said aerodynamic surface, wherein said means comprises an impeller including a hollow hub having a wall of substantially conoidal shape and providing a forward apex portion and a rear base portion fairing with the circumferential surface of said aerodynamic body to cooperate in providing a substantially continuous air foil surface from said apex portion rearwardly along said aerodynamic body, and a plurality of blades spaced apart circumferentially on said wall of the hub and projecting radially from said air foil surface, said blades extending rearwardly on said wall of the hub in longitudinal planes passing through the axis of the hub from said apex portion continuously to said transverse plane, an opening in the apex portion of said hub, a cone within the conoidal hub and spaced inwardly of said wall to provide a passageway therebetween for passage of fluid from said opening into the streamlined hollow body, means for rotatably mounting the impeller with the axis thereof in the axis of the aerodynamic body, said blades providing longitudinal passageways therebetween for flow of the fluid, the forward ends of said blades being of substantially greater depth than the depth of their rear ends, and means connecting the power unit with the hub for actuating the impeller to circumvolve and impart energy to the fluid for increasing relative velocity in said rearward direction while the fluid is retained in contact with said air foil surface incidental to forward movement of said body.

15. A combination as described in claim 14, wherein the overall diameter of the blades is approximately the largest outside diameter of the elongated streamlined body.

16. The combination as described in claim 14, wherein the length of the blades is greater than the depth of the forward ends of said blades.

17. The combination as described in claim 14, wherein the overall diameter of the blades at the apex portion of the conoidal hub is at least two-thirds of the largest diameter of said elongated streamline body.

References Cited in the file of this patent

UNITED STATES PATENTS

| | | |
|---|---|---|
| 1,341,653 | Lee | June 1, 1920 |
| 1,642,270 | Slate | Sept. 13, 1927 |
| 1,651,230 | Schumaker | Nov. 29, 1927 |
| 1,853,361 | Kelly | Apr. 12, 1932 |
| 2,075,423 | Bratschie | Mar. 30, 1937 |
| 2,138,999 | Clark | Dec. 6, 1938 |
| 2,194,890 | Seversky | Mar. 26, 1940 |
| 2,270,686 | Moore | Jan. 20, 1942 |
| 2,330,622 | Ramshorn | Sept. 28, 1943 |
| 2,340,427 | Putt | Feb. 1, 1944 |

FOREIGN PATENTS

| | | |
|---|---|---|
| 543,399 | France | Sept. 1, 1922 |
| 775,991 | France | Jan. 14, 1935 |